(12) United States Patent
Villaescusa Alonso et al.

(10) Patent No.: US 6,652,831 B1
(45) Date of Patent: Nov. 25, 2003

(54) ZEOLITE ITQ-7

(75) Inventors: Luis Ángel Villaescusa Alonso, Valencia (ES); Miguel Ángel Camblor Fernández, Valencia (ES)

(73) Assignees: Consejo Superior de Investigaciones Cientificas, Madrid (ES); Universidad Politecnica de Valencia, Valencia (ES)

(*) Notice: Subject to any disclaimer, the term of this patent is extended or adjusted under 35 U.S.C. 154(b) by 0 days.

(21) Appl. No.: 09/868,891

(22) PCT Filed: Dec. 22, 1999

(86) PCT No.: PCT/ES99/00401
§ 371 (c)(1),
(2), (4) Date: Oct. 1, 2001

(87) PCT Pub. No.: WO00/37360
PCT Pub. Date: Jun. 29, 2000

(30) Foreign Application Priority Data

Dec. 22, 1998 (ES) .............................................. 9802697

(51) Int. Cl.$^7$ .......................... C01B 37/02; C01B 39/48
(52) U.S. Cl. ...................... 423/706; 423/709; 423/718; 423/335
(58) Field of Search ................ 423/706, 709, 423/718, 335

(56) References Cited

U.S. PATENT DOCUMENTS

| 5,362,697 A | * 11/1994 | Fung et al. ................. 423/718 |
| 5,591,421 A | * 1/1997 | Zones ......................... 423/706 |
| 6,027,707 A | * 2/2000 | Casci et al. ................. 423/705 |
| 6,136,290 A | * 10/2000 | Benazzi et al. ............. 423/705 |

OTHER PUBLICATIONS

Villaescusa et al., "ITQ-7: A Pure Silica Polymorph with Three-Dimensional System of Large Pore Channels," Angew. Chem. Eng. Ed., vol. 38, No. 13/14, pp 1997–2000, Jul. 12, 1999.*

* cited by examiner

Primary Examiner—David Sample
(74) Attorney, Agent, or Firm—Klauber & Jackson (57) ABSTRACT The present invention refers to a microporous crystalline material of zeolitic nature named ITQ-7, to the process of preparation thereof and to the use of ITQ-7 in processes of separation and transformation of organic compounds. The zeolitic material of this invention is also characterized by its characteristic X-ray diffraction pattern and its microporous properties.

The process of preparation is characterized in the use of one or several organic additives in a reaction mixture that is crystallized by heating.

21 Claims, 6 Drawing Sheets

ZEOLITE ITQ-7

TECHNICAL FIELD

Microporous crystalline materials

BACKGROUND

Zeolites are microporous crystalline materials of variable composition characterized by a $TO_4$ tetrahedra crystalline lattice (wherein T represents atoms in the formal oxidation state of +3 or +4, such as for example Si, Ti, Al, Ge, B, Ga . . . ) which all share their vertexes giving rise to a three-dimensional structure containing channels and/or cavities of molecular dimensions. When some of the atoms T have an oxidation state lower than +4, the crystalline lattice formed has negative charges which are compensated by the presence of organic or inorganic cations in the channels or cavities. Organic molecules and $H_2O$ may also be located in said channels and cavities, so in general, the chemical composition of zeolites can be represented by the following empirical formula:

$$X(M_{1/n}XO_2):yYO_2:zR:wH_2O$$

wherein M is one or several organic or inorganic cations with charge +n; X is one or several trivalent elements; Y is one or several tetravalent elements, generally Si; and R is one or several organic substances. Although the nature of M, X, Y and R and the values of x, y, z, and w may, in general, be varied by means of post-synthesis treatments, the chemical composition of a zeolite (just as it is synthesized or after calcination thereof) has a range characteristic of each zeolite and its preparation method.

On the other hand, a zeolite is also characterized by its crystalline structure, which defines a system of channels and cavities and gives rise to a specific X-ray diffraction pattern. In this way, zeolites are differentiated from each other by their range of chemical composition plus their X-ray diffraction pattern. Both characteristics (crystalline structure and chemical composition) also determine the physico-chemical properties of each zeolite and the applicability thereof in different industrial processes.

DESCRIPTION OF THE INVENTION

The present invention refers to a microporous crystalline material of zeolitic nature named ITQ-7, to its method of preparation and to its applications.

The material is characterized by its chemical composition and by its X-ray diffraction pattern. In its anhydrous and calcined form, the chemical composition of ITQ-7 may be represented by the empirical formula:

$$x(M_{1/n}XO_2):yYO_2:SiO_2$$

wherein x has a value lower than 0.06, it may be equal to zero; y has a value lower than 0.1; it may also be equal to zero; M is $H^+$ or an inorganic cation of charge +n; X is a chemical element with oxidation state +3 (such as, for example, Al, Ga, B, Cr) and Y is a chemical element with oxidation state +4 (such as, for example, Ti, Ge, V). When x=0 and y=0, the material may be described as a new polymorphic form of the silica ($SiO_2$) characterized by its microporous structure. In a preferred embodiment of the present invention, ITQ-7 has the composition, in a calcined and anhydrous state $$x(HXO_2):SiO_2$$

wherein X is a trivalent element and x has a value lower than 0.06 and may be equal to zero, in which case the material may be described by the formula $SiO_2$. The existence of defects in the crystalline network, that is manifested by the presence of Si—OH groups (silanols) is possible, however, in terms of the synthesis method and its calcination or subsequent treatments. These defects have not been included in the preceding empirical formulae. In a preferred embodiment of the present invention, ITQ-7 has a very low concentration of this type of defect (silanol concentration lower than 15% with respect to the total Si atoms, preferably lower than 6%, measured by nuclear magnetic resonance spectroscopy of $^{29}Si$ in magic angle).

TABLE I

| 2θ (degrees) | $I/I_0(\%)$ |
|---|---|
| 6.9 | 35 |
| 7.08 | 40 |
| 9.78 | 45 |
| 9.89 | 60 |
| 12.07 | 15 |
| 12.66 | 20 |
| 13.78 | <5 |
| 14.27 | 5 |
| 15.51 | 10 |
| 15.73 | 5 |
| 17.01 | 35 |
| 17.18 | 10 |
| 18.77 | 10 |
| 18.97 | 20 |
| 19.60 | 35 |
| 19.79 | 40 |
| 20.83 | 10 |
| 21.22 | 20 |
| 21.90 | 70 |
| 22.33 | 100 |
| 22.40 | 40 |
| 22.52 | 10 |
| 23.04 | 5 |
| 23.39 | 25 |
| 24.21 | 20 |
| 25.05 | 10 |
| 25.39 | 10 |
| 25.76 | 10 |
| 26.04 | 5 |
| 26.33 | <5 |
| 27.37 | 5 |
| 27.79 | 10 |
| 28.40 | 15 |
| 28.49 | 10 |
| 28.79 | 5 |
| 29.02 | 10 |
| 29.56 | 20 |
| 29.83 | 15 |
| 30.09 | 5 |
| 30.41 | <5 |
| 30.80 | 5 |
| 31.25 | 10 |
| 31.69 | <5 |
| 32.10 | <5 |
| 32.47 | <5 |
| 32.86 | 10 |
| 33.02 | 20 |
| 34.30 | <5 |
| 35.16 | 5 |
| 35.70 | 15 |
| 36.16 | 10 |
| 36.40 | <5 |
| 37.06 | <5 |
| 37.90 | <5 |
| 38.44 | <5 |
| 39.09 | <5 |
| 39.77 | <5 |

The positions, widths and relative intensities of the peaks depend to a certain degree on the chemical composition of the material (the pattern represented in Table I refers to materials whose lattice is exclusively comprised of silicon oxide, $SiO_2$ and synthesized using a quaternary ammonium cation as a structure-directing agent) and they may also be affected by structural alterations such as intergrowths, macles and stacking defects. The relative intensities may also be affected by phenomena of preferred orientation of the crystals, produced during the preparation of the sample, while the precision in the interplanar spacing measurement depends on the quality of alignment of the goniometer. Moreover, calcination gives rise to significant changes in the X-ray diffraction pattern, due to the removal of organic compounds retained during synthesis in the zeolite pores, so that Table II represents the diffraction pattern of calcined ITQ-7 with a composition $SiO_2$.

TABLE II

| 2θ (degrees) | $I/I_0(\%)$ |
|---|---|
| 6.9 | 55 |
| 7.76 | 45 |
| 9.76 | 80 |
| 9.86 | 40 |
| 12.59 | <5 |
| 13.78 | 10 |
| 14.05 | 5 |
| 14.22 | <5 |
| 15.43 | 10 |
| 15.66 | 10 |
| 15.82 | <5 |
| 16.95 | 5 |
| 17.13 | 5 |
| 18.70 | <5 |
| 18.90 | 10 |
| 19.54 | 15 |
| 19.73 | 15 |
| 20.76 | <5 |
| 21.13 | 10 |
| 21.88 | 40 |
| 22.25 | 60 |
| 22.32 | 20 |
| 22.40 | 5 |
| 22.98 | <5 |
| 23.32 | 10 |
| 24.14 | 10 |
| 24.96 | 5 |
| 25.30 | 5 |
| 25.68 | 5 |
| 25.98 | 5 |
| 26.25 | 5 |
| 27.26 | <5 |
| 27.72 | 10 |
| 28.31 | 10 |
| 28.40 | 5 |
| 28.49 | <5 |
| 28.94 | 5 |
| 29.49 | 10 |
| 29.75 | 5 |
| 30.00 | 5 |
| 30.35 | <5 |
| 30.67 | <5 |
| 31.14 | 10 |
| 31.60 | <5 |
| 31.92 | <5 |
| 32.40 | <5 |
| 32.90 | 5 |
| 34.26 | <5 |
| 35.04 | <5 |
| 35.64 | 5 |
| 36.01 | <5 |
| 36.27 | <5 |
| 36.95 | <5 |
| 37.82 | <5 |
| 38.83 | <5 |
| 38.97 | <5 |
| 39.65 | <5 |

Figure 1:
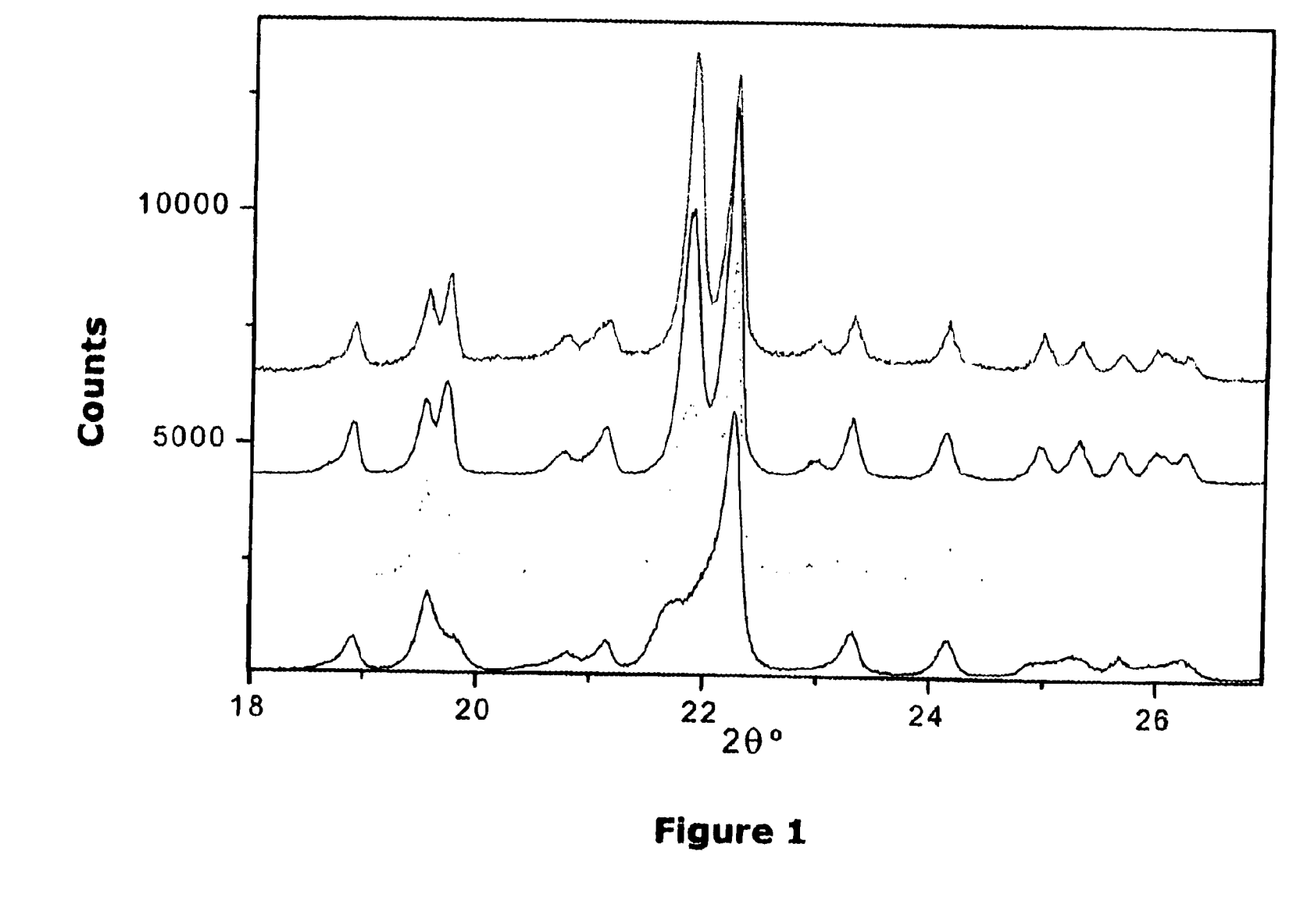
FIG. 1 shows x-ray diffraction patterns for various calcined ITQ-7 samples prepared under different conditions.

Furthermore, the relative intensities of the peaks as well as their widths may be affected by the phenomena of preferred orientation and differences of crystal size, as well as by structural alterations such as macles, intergrowths and stacking defects. These differences are illustrated in FIG. 1, wherein the diffraction patterns corresponding to calcined ITQ-7 samples with a composition $SiO_2$ prepared under different conditions are shown.

From the point of view of its chemical composition, ITQ-7 is characterized by having a (Si+Y)/X ratio higher than 8, wherein the X element may be constituted exclusively by Al, and by its low concentration of connectivity defects (<15%, preferably <6%). Furthermore, ITQ-7 may be synthesized without Al, or another element with oxidation state +3, in which case ITQ-7 is a new polymorphic form of silica of microporous nature.

The present invention also refers to the method of preparation of ITQ-7. This comprises thermal treatment at a temperature between 80 and 200° C., preferably between 130 and 180° C., of a reaction mixture that contains a source of $SiO_2$ (such as, for example, tetraethylorthosilicate, colloidal silica, amorphous silica), an organic cation in hydroxide form, preferably 1,3,3-trimethyltricyclo-6-azonium-[3.2.1.4$^{6.6}$]dodecane hydroxide (I), hydrofluoric acid and water. Alternatively, it is possible to use the organic cation in the form of a salt (for example, a halide, preferably chloride or bromide) and to substitute the hydrofluoric acid by a fluorine salt, preferably $NH_4F$. The reaction mixture is characterized by its relative low pH, pH<12, preferably pH<10 and it may also be neutral or slightly acidic.

I

Cation I has two asymmetric carbons and may be used either as a racemic mixture or as any of its two enantiomers or as mixtures of both enantiomers.

Optionally it is possible to add a source of another tetravalent element Y and/or trivalent element X, preferably Ti or Al. The addition of this element may be done before heating the reaction mixture or in an intermediate time during said heating. Occasionally, it may also be convenient to add at a certain time of the preparation ITQ-7 crystals (up to 15% by weight with respect to the total inorganic oxides, preferably less than 10% by weight) as crystallization promoters (seeding). The composition of the reaction mixture responds to the general empirical formula $$rR_2O:aHF:xXO_2:yYO_2:SiO_2:wH_2O$$

wherein X is one or several trivalent elements, preferably Al; Y is one or several tetravalent elements; R is an organic cation, preferably 1,3,3-trimethyltricyclo-6-azonium-[3.2.1.4$^{6.6}$]dodecane; and the values of r, a, x, y and w are in the ranges r=0.05–4.0, preferably 0.1–3.0 a=0–4.0, preferably 0.1–3.0 x=0–0.12 y=0–0.5 w=0–100, preferably 1–50, more preferably 1–15

The thermal treatment of the reaction mixture may be done in static or with stirring of the mixture. Once the crystallization has finished, the solid product is separated and dried. Subsequent calcination at temperatures between 400 and 650° C., preferably between 450 and 600° C., produces the decomposition of the organic residues occluded in the zeolite and the removal thereof and of the fluoride anion, rendering the zeolitic channels free.

This method of synthesis of ITQ-7 zeolite has the peculiarity that it does not require the introduction of alkali cations in the reaction medium. As a result the organic cation R is the only cation that balances the lattice charges when the zeolite contains a trivalent element in its crystalline lattice. Therefore, simple calcination in order to decompose the organic cation leaves the zeolite in acid form, without the need to resort to cation exchange processes. Therefore, the material once calcined responds to the general formula $$x(HXO_2):yYO_2:SiO_2$$

wherein x has a value lower than 0.06, it may be equal to zero; y has a value lower than 0.1, it may likewise be zero; X is a chemical element with oxidation state +3 and Y is a chemical element with oxidation +4.

EXAMPLES

Example 1

This example illustrates the preparation of 1,3,3-trimethyltricyclo-6-azonium-[3.2.1.4$^{6.6}$]dodecane hydroxide 94.1 g of 1,4-dibromobutane and 99% Aldrich are added to a 500 ml flask with a rounded bottom with a solution comprised of 380 ml H$_2$O and 15 g NaOH and the mixture is refluxed with stirring. When the solution begins to reflux 68.0 g of 1,3,3-trimethyl-6-azabicyclo(3.2.1.)octane (Aldrich) are added drop by drop and in a period of 2 hours. After 3 hours under reflux, the mixture is allowed to cool and 150 g of an aqueous solution of 40% NaOH by weight are added. Chloroform is added and with the help of a decanting funnel, the organic part is taken. The operation is repeated three times and finally the organic solvent is eliminated in a rotavapor. The solid obtained is washed with ether the amount obtained being 116.8 g. The solid may be purified by recrystallization in methanol/ethyl acetate with a yield of 90%. The nuclear magnetic resonance spectrum in D$_2$O indicates that it is the cyclization product of nucleophilic substitution, in other words, bromide of the organic cation 1,3,3-trimethyltricyclo-6-azonium-[3.2.1.4$^{6.6}$]dodecane. The elemental analysis gives this result: 4.63% N, 55.26% C, 8.53% H.

The hydroxide form of the structure-directing agent is obtained by anion exchange using a Dowex 1 resin (Sigma) previously washed with distilled water up to a pH=7. 75.5 g of resin are added to a solution of 18.70 g of the previous product in 75.8 g. of water and it is allowed to be stirred for about 12 hours. After filtering the resin, the solution is titrated with HCl (aq), using phenolphthalein as the indicator and finding an efficiency of 92.6% in the exchange. This solution may be concentrated in the rotavapor for use thereof in synthesis of molecular sieves, for example in a concentration of 1M.

Example 2

This example illustrates the preparation of ITQ-7 by using the cation 1,3,3-trimethyltricyclo-6-azonium-[3.2.1.4$^{6.6}$]dodecane.

Figure 2:
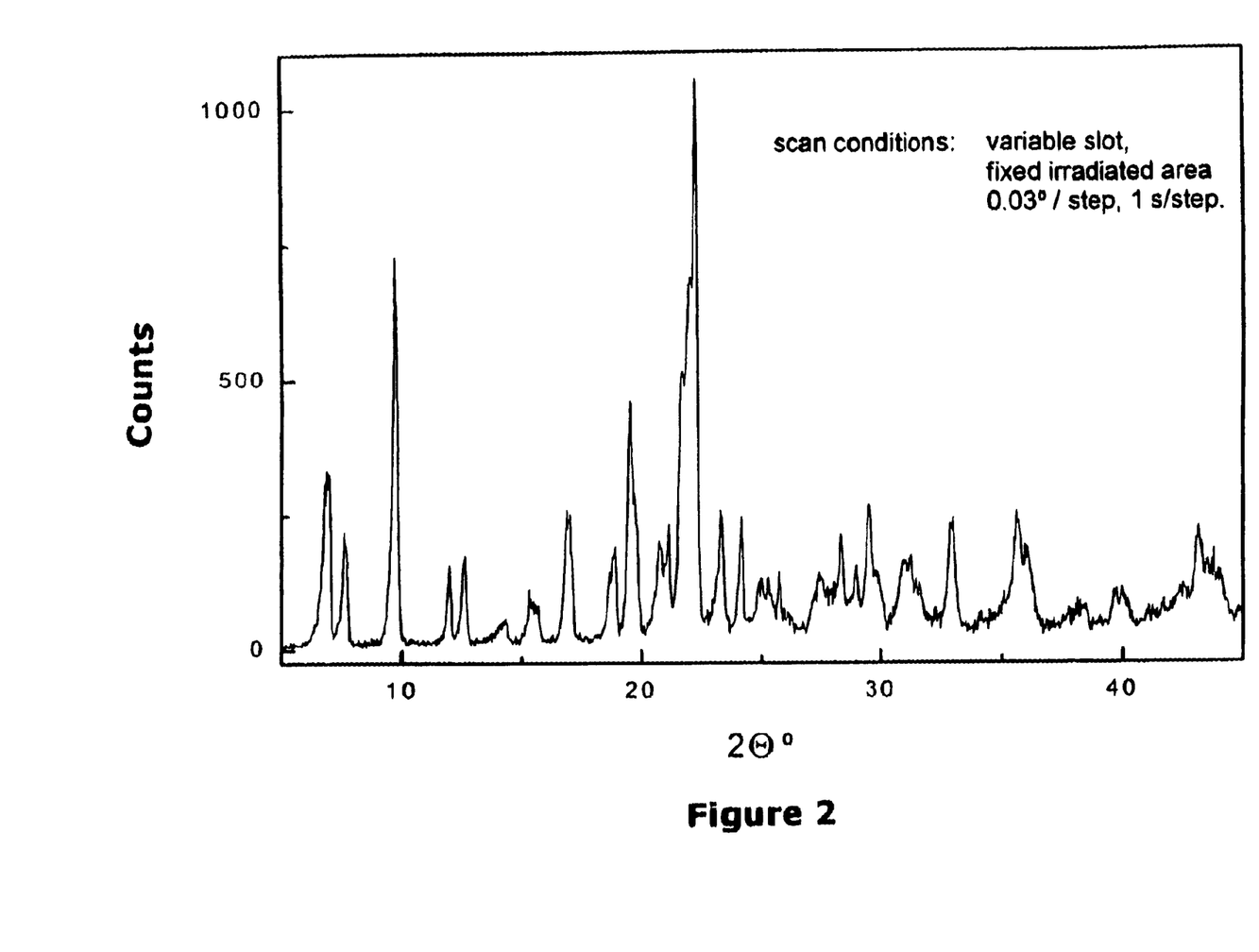
FIGS. 2 and 3 are the x-ray diffraction patterns for the ITQ-7 of Example 2 in the assynethesized and calcined state, respectively.
Figure 3:
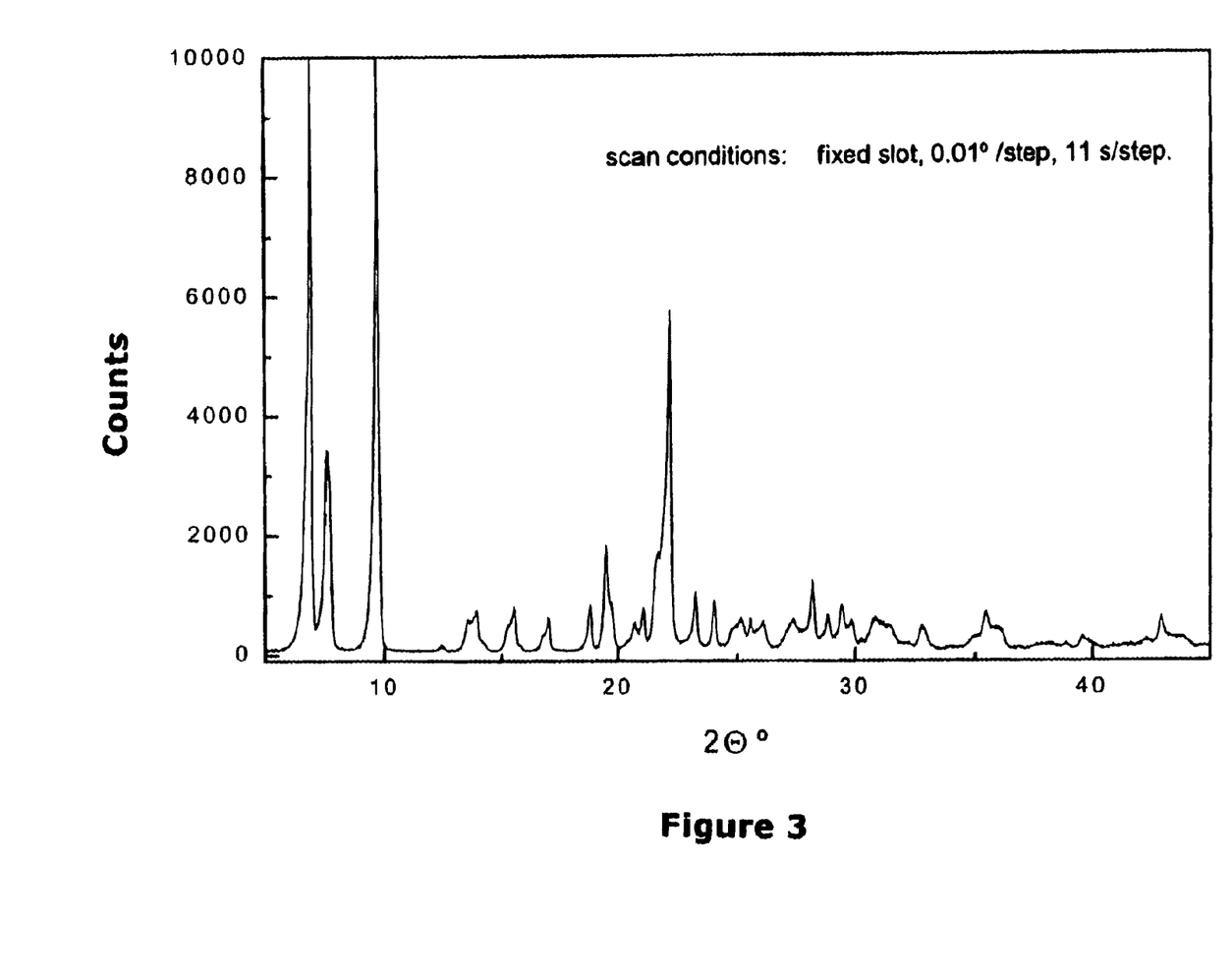

19.01 g of tetraethylorthosilicate (TEOS) are added to 56.62 g of a 1,3,3-trimethyltricyclo-6-azonium[3.2.1.4$^{6.6}$]dodecane hydroxide solution that contains 0.81 molecules of hydroxide in 1000 g. The mixture is stirred, allowing evaporation of 48.53 g of substance, corresponding to the alcohol coming from the hydrolysis of TEOS plus a certain amount of water. 1.90 g of a solution of HF in water (48% by weight) is added and the mixture is homogenized. The paste obtained is introduced in an autoclave provided with polytetrafluoroethylene inner lining and heated to 150° C. at the same time that the autoclave is kept under rotation (60 rpm) for 13 days. Then, the autoclave is cooled, the contents are filtered, the solid is washed with water and dried at 100° C. (20.5 g of solid per 100 g of gel). The X-ray diffraction pattern shows that the solid is pure ITQ-7 (FIG. 2.) Calcination at 580° C. in air for 3 hours permits the occluded species to be eliminated and the diffraction pattern obtained is shown in FIG. 3.

Examples 3 to 6

These examples illustrate the preparation of ITQ-7 in other conditions of temperature and chemical composition using the cation 1,3,3-trimethyltricyclo-6-azonium-[3.2.1.4$^{6.6}$]dodecane.

Figure 4:
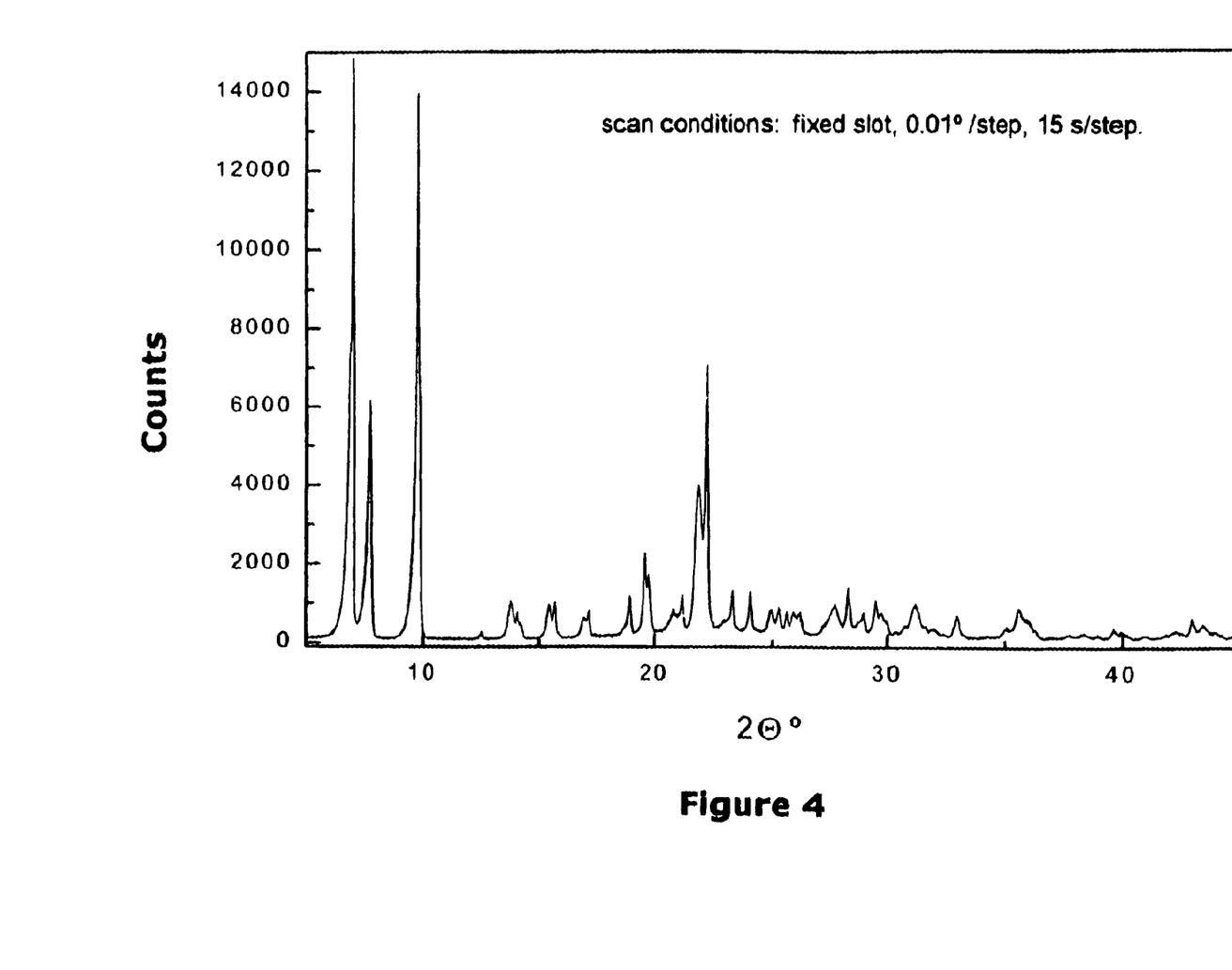
FIGS. 4–6 are x-ray diffraction patterns for calcined ITQ-7 products.
Figure 5:
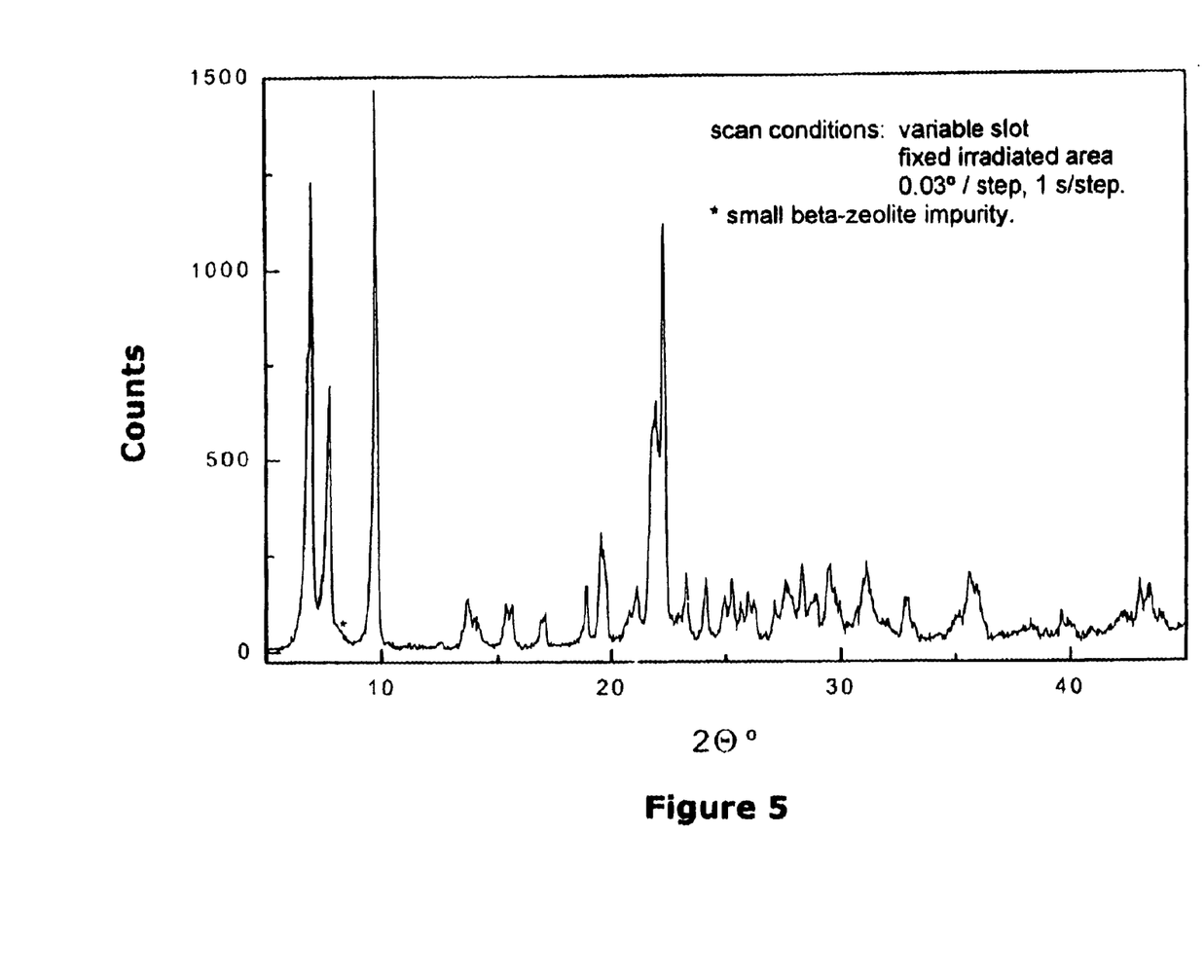
Figure 6:
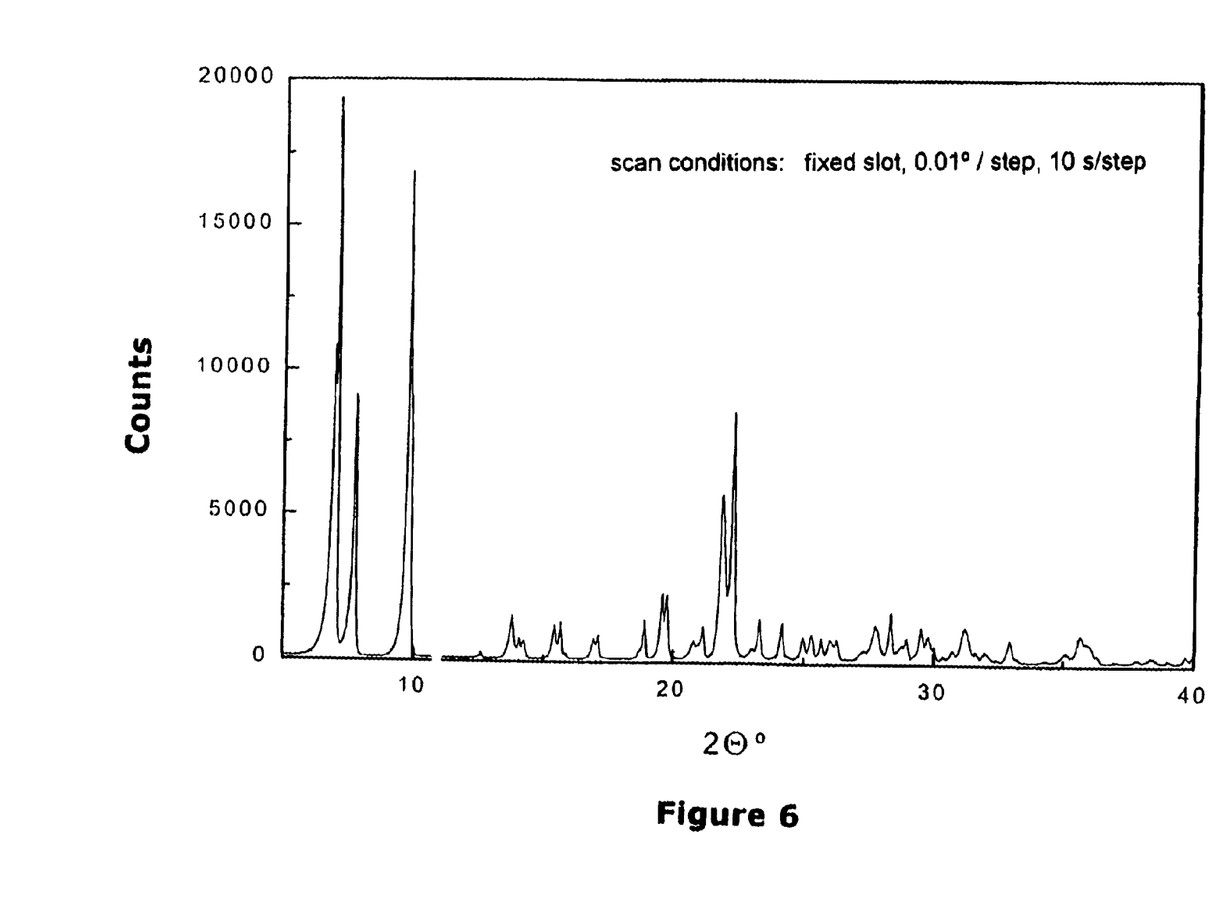

The same process as in example 2 is followed, with the amounts and concentrations of reagents, evaporated mass, temperature and crystallization time that are shown in the following table, wherein ROH means 1,3,3-trimethylcyclo-6-azonium-[3.2.1.4$^{6.6}$]dodecane hydroxide. Occasionally, a mixture of ITQ-7 zeolites and Beta is obtained. The X-ray diffraction patterns corresponding to the products ITQ-7 once calcined are shown in FIGS. 4 to 6.

| example | TEOS mass (g) | ROH solution concentration (mol * 10$^3$) | ROH solution mass (g) | evaporation mass (g) | HF, 48% in water mass (g) | Temperature (° C.) | time (days) | Yield (% in mass) | DRX (figure) |
|---|---|---|---|---|---|---|---|---|---|
| 3 | 17.71 | 0.62 | 68.93 | 69.15 | 1.77 | 175 | 12 | 26.9 | ITQ-7(4) |
| 4 | 18.25 | 1.01 | 43.51 | 44.09 | 1.83 | 135 | 14 | 27.8 | Beta + ITQ-7 |

-continued

| example | TEOS mass (g) | ROH solution concentration (mol * 10³) | mass (g) | evaporation mass (g) | HF, 48% in water mass (g) | Temperature (° C.) | time (days) | Yield (% in mass) | DRX (figure) |
|---|---|---|---|---|---|---|---|---|---|
| 5 | 10.33 | 1.07 | 24.64 | 23.66 | 1.03 | 150 | 10 | 24.4 | ITQ-7(5)* |
| 6 | 2.61 | 0.90 | 41.87 | 34.40 | 1.56 | 150 | 15 | 2.8 | ITQ-7(6) | the presence of a very small impurity of Beta zeolite is observed.

What is claimed is:

1. A microporous crystalline material of zeolitic nature with an X-ray diffraction pattern in accordance with what is established in Tables I and II for the material just as it is synthesized and after calcination, respectively, and with a chemical composition in the calcined and anhydrous state that may be represented by the following empirical formula $$x(M_{1/n}XO_2):yYO_2:SiO_2$$

wherein x has a value lower than 0.06; it may be equal to zero; y has a value lower than 0.1; it may likewise be equal to zero; M is H⁺ or an inorganic cation of charge +n; X is a chemical element with oxidation state +3 and Y is a chemical element with oxidation state +4.

2. A microporous crystalline material according to claim 1 whose chemical composition in the calcined and anhydrous state may be represented by the following empirical formula $$x(HXO_2):yYO_2:SiO_2$$

wherein X is a trivalent element; Y is a tetravalent element different from Si, x has a value lower than 0.06; it may be equal to zero, y has a value lower than 0.1; it may likewise be equal to zero, and wherein the cation H⁺ may be exchanged by other mono-, di- or trivalent organic or inorganic cations.

3. A microporous crystalline material according to claim 1 whose chemical composition in the calcined and anhydrous state may be represented by the following empirical formula $$x(HAlO_2):SiO_2$$

wherein x has a value lower than 0.06; it may be equal to zero, and wherein the cation H⁺ may be exchanged by other mono-, di- or trivalent organic or inorganic cations.

4. A microporous crystalline material according to claim 1 whose chemical composition in the calcined and anhydrous state may be represented as $SiO_2$.

5. A microporous crystalline material according to claim 1 wherein X is a chemical element with oxidation state +3 selected from the group consisting of Al, Ga, B and Cr.

6. A microporous crystalline material according to claim 5, wherein X is a trivalent element selected from the group consisting of Al, B, Ga and Cr.

7. A microporous crystalline material according to claim 5, wherein Y is a tetravalent element selected from the group consisting of Ti, Ge and V.

8. A microporous crystalline material according to claim 1, wherein Y is a chemical element with oxidation state +4 selected from the group consisting of Ti, Ge and V.

9. A method for synthesizing a microporous crystalline material of zeolitic nature with an X-ray diffraction pattern in accordance with what is established in Tables I and II for the material just as it is synthesized and after calcination, respectively and with a chemical composition in the calcined and anhydrous state that may be represented by the following empirical formula $$x(M_{1/n}XO_2):yYO_2:SiO_2$$

wherein x has a value lower than 0.06; it may be equal to zero; y has a value lower than 0.1; it may likewise be equal to zero; M is H⁺ or an inorganic cation of charge +n; X is a chemical element with oxidation state +3 and Y is a chemical element with oxidation state +4, wherein a reaction mixture that contains at least:

a source of $SiO_2$, the organic cation 1,3,3-trimethyltricyclo-6-azonium-[3.2.1.4^{6.6}]dodecane in racemic form, or as some of the enantiomers thereof or mixtures thereof, a source of fluor F, and water is subjected to heating with or without stirring at a temperature between 80 and 200° C., until achieving crystallization thereof and wherein the reaction mixture has a composition in terms of molar ratios of oxides, comprised between the ranges $X_2O_3/SiO_2$=0–0.25, $ROH/SiO_2$=0.05–4.0, $F^-/Si$=0–4.0, $YO_2/SiO_2$=0–0.5 and $H_2O/SiO_2$=0–100.

10. A method according to claim 9, wherein a reaction mixture that contains a source of $SiO_2$, the organic cation 1,3,3-trimethyltricyclo-6-azonium-[3.2.1.4^{6.6}]dodecane in racemic form, as some of the enantiomeres thereof, or mixtures thereof, a source of fluoride anions, a source of one or several trivalent elements X and water is subjected to heating with or without stirring at a temperature between 80 and 200° C., until achieving crystallization thereof, and wherein the reaction mixture has a composition, in terms of molar ratios of oxides, comprised between the ranges $X_2O_3/SiO_2$=0–0.25, $ROH/SiO_2$=0.05–4.0, $F^-/Si$=0–4.0, and $H_2O/SiO_2$=0–100.

11. A method according to claim 9, wherein a reaction mixture that contains a source of $SiO_2$, the organic cation 1,3,3-trimethyltricyclo-6-azonium-[3.2.1.4^{6.6}]dodecane in racemic form, as some of the enantiomers thereof, of mixtures thereof, a source of fluoride anions, a source of Al and water is subjected to heating with or without stirring at a temperature between 80 and 200° C., until achieving crystallization thereof, and wherein the reaction mixture has a composition, in terms of molar ratios of oxides, comprised between the ranges $Al_2O_3/SiO_2=0-0.25$ $ROH/SiO_2=0.05-4.0$, $F^-/Si=0-4.0$, and $H_2O/SiO_2=0-100$.

12. A method according to claim 9, wherein a reaction mixture that contains a source of $SiO_2$, the organic cation 1,3,3-trimethyltricyclo-6-azonium-[3.2.1.4$^{6.6}$]dodecane in racemic form, as some of the enantiomers thereof, or mixtures thereof, a source of fluoride anions and water is subjected to heating with or without stirring at a temperature between 80 and 200° C., until achieving crystallization thereof, and wherein the reaction mixture has a composition in terms of molar ratios of oxides, comprised between the ranges $ROH/SiO_2=0.05-4.0$, $F^-/Si=0-4.0$, and $H_2O/SiO_2=0-100$.

13. A method according to claim 9, wherein a reaction mixture that contains a source of $SiO_2$, the organic cation 1,3,3-trimethyltricyclo-6-azonium-[3.2.1.4$^{6.6}$]dodecane in racemic form, or as some of the enantiomers thereof, or mixtures thereof, a source of fluoride anion, a source of one or several tetravalent elements Y different from Si, and water is subjected to heating with or without stirring at a temperature between 80 and 200° C., until achieving crystallization thereof, and wherein the reaction mixture has a composition, in terms of molar ratios of oxides, comprised between the ranges $ROH/SiO_2=0.05-4$, $F^-/Si=0-4$, $YO_2/SiO_2=0-0.5$, and $H_2O/SiO_2=0-100$.

14. A method according to claim 9, wherein the organic cation 1,3,3-trimethyltricyclo-6-azonium-[3.2.1.4$^{6.6}$] dodecane in racemic form, as some of the enantiomers thereof or mixtures thereof is added in hydroxide form or in the form of a mixture of hydroxide and another salt, and the fluoride anion is added in the form of hydrofluoric acid or another salt, in such a way that the pH of the mixture is equal to or lower than 12, and it may even be neutral or slightly acid.

15. A method according to claim 9 wherein an amount of crystalline material as crystallization promoter is added to the reaction mixture, said amount being comprised in the range of 0.01 to 15% by weight with respect to the total silica added.

16. A method according to claim 15 wherein the other salt of the organic cation 1,3,3-trimethyltricyclo-6-azonium-[3.2.1.4$^{6.6}$]dodecane is a halide.

17. A method according to claim 15 wherein the fluoride anion is added in the form of ammonium fluoride.

18. A method according to claim 15, wherein an amount of crystalline material with the characteristics of the material of claim 1 is added to the reaction mixture.

19. A method according to claim 9 wherein alkali cations are not added to the reaction mixture.

20. A method according to claim 9, wherein a source of a tetravalent element Y other than Si is added, or of a trivalent element, X, is added in an intermediate step during the heating of the reaction mixture.

21. A method according to claim 9, wherein a reaction mixture that contains a source of $SiO_2$, the organic cation 1,3,3-trimethyltricyclo-6-azonium-[3.2.1.4$^{6.6}$]dodecane in racemic form, as some of the enantiomers thereof, or mixtures thereof, a source of fluoride anion, a source of one or several tetravalent elements Y different from Si, a source of one or several trivalent elements X, and water, is subjected to heating with or without stirring at a temperature between 80 and 200° C., until achieving crystallization thereof, and wherein the reaction mixture has a composition, in terms of molar ratios of oxides, comprised between the ranges $ROH/SiO_2=0.05-4$, $F^-/Si=0-4$, $YO_2/SiO_2=0-0.5$ and $H_2O/SiO_2=0-100$.

* * * * *